United States Patent [19]

Bell

[11] Patent Number: 5,530,501
[45] Date of Patent: Jun. 25, 1996

[54] PHOTOGRAPHIC CAMERA WITH DATA RECORDING ON FILM

[75] Inventor: Cynthia S. Bell, Webster, N.Y.

[73] Assignee: Eastman Kodak Company, Rochester, N.Y.

[21] Appl. No.: 268,218

[22] Filed: Jun. 29, 1994

[51] Int. Cl.⁶ .................................................. G03B 17/24
[52] U.S. Cl. .................................... 354/106; 354/76
[58] Field of Search ............................. 354/75, 76, 105, 354/106

[56] References Cited

U.S. PATENT DOCUMENTS

| | | | |
|---|---|---|---|
| 3,820,881 | 6/1974 | Friesen | 352/5 |
| 4,150,882 | 4/1979 | Konick | 352/39 |
| 4,215,920 | 8/1980 | Butler | 352/92 |
| 4,504,130 | 3/1985 | Bell et al. | 352/92 |
| 4,659,213 | 4/1987 | Matsumoto | 355/38 |
| 4,707,120 | 11/1987 | Yamamoto | 355/38 |
| 4,937,615 | 6/1990 | Tokuda | 355/35 |
| 4,951,086 | 8/1990 | Hicks | 355/41 |
| 5,027,140 | 6/1991 | Cloutier | 354/76 |
| 5,029,313 | 7/1991 | Robison et al. | 355/40 |
| 5,119,119 | 6/1992 | Amano et al. | 354/106 |
| 5,187,518 | 2/1993 | Kitegawa | 355/40 |
| 5,231,451 | 7/1993 | Uekusa et al. | 355/29 |
| 5,276,472 | 1/1994 | Bell | 354/76 |
| 5,344,730 | 9/1994 | Kitamono | 430/14 |
| 5,363,157 | 11/1994 | Cocca | 354/76 |
| 5,387,955 | 2/1995 | Cocca | 354/76 |
| 5,389,989 | 2/1995 | Hawkins et al. | 354/106 |

*Primary Examiner*—Russell E. Adams
*Assistant Examiner*—Daniel Chapik
*Attorney, Agent, or Firm*—Francis H. Boos, Jr.

[57] ABSTRACT

Recording of data segments on film in a photographic still camera continuously along a length of film spanning interframe locations between image frame regions is interrupted at predetermined intervals corresponding to multiples of image frames at which the film is normally cut into strip at a photofinishing facility. Codes are recorded at the beginning and end of a recorded segment and upon recommencement of recording following each interruption such that continuous, uninterrupted playback of the data segment is facilitated.

11 Claims, 6 Drawing Sheets

PHOTOGRAPHIC CAMERA WITH DATA RECORDING ON FILM

CROSS-REFERENCE TO RELATED APPLICATION

Reference is made to commonly assigned copending application Ser. No. 08/110,280, entitled "CAMERA UTILIZING VARIABLE AUDIO FILM FRAME FOR OPTICAL ENCODING OF AUDIO INFORMATION" and filed in the name of J. D. Cocca.

FIELD OF THE INVENTION

The invention relates generally to photographic still cameras and methods for recording data such as audio information directly on photographic film wherein the physical length of film employed for an audio recording segment can extend beyond the length of an image frame exposure on the film.

BACKGROUND OF THE INVENTION

Photographic still cameras and methods have been proposed for recording audio information on film associated with exposed image frames on the film. Such an arrangement is disclosed in commonly assigned U.S. Pat. No. 4,965,627 and the applications cross-referenced therein. In the arrangement described in this patent, audio signals are magnetically recorded in dedicated tracks in a virtually transparent magnetic layer disposed on the photographic film. The audio tracks are confined to the region of individual image frames with which they are associated and thus are restricted in the amount of audio that can be recorded. Another example is found in commonly assigned copending U.S. application Ser. No. 08/110659, filed Aug. 19, 1993, entitled "Camera Utilizing Variable Audio Film Frame for Optical Encoding of Audio Information". This arrangement utilizes optical recording of audio in the image frame region of the film and has the advantage that variable lengths of audio segments can be recorded which may run through the interframe locations (interframe locations) between image frames and thereby span more than one image frame depending on the audio recording time selected by the user.

It is known practice of photofinishing labs to cut processed film into strips of predetermined length, such as 4, 5 or 6 image frame lengths, for convenient handling and storage in print envelopes. With variable recording length spanning the interframe locations, it is possible for the film to be cut in the middle of an audio recording segment. Playback of audio recording segments interrupted in this manner is not possible. There is therefore a need for audio recording on photographic film that allows for variable extended recording lengths that can go beyond the bounds of customary image frames on the film and that obviates the problem of interrupting the recording in a manner that makes playback impossible. The present invention satisfies this need.

SUMMARY OF THE INVENTION

In accordance with the invention, there is provided a photographic camera with audio recording on film which comprises audio signal recording means for recording audio information continuously along a stretch of photographic film spanning at least one interframe location between successive standard image frame areas on the film and control means for interrupting the continuous recording during those interframe areas that occur at predetermined intervals of at least four successive image frame lengths corresponding to intervals at which the film is cut into strips at a photofinishing facility.

In the method of the invention, audio information is recorded on photographic film along a length thereof spanning interframe locations between image frame regions on the film and the recording is interrupted periodically at those interframe locations corresponding to multiples of frame lengths at which the film strip is cut at a photofinishing facility. At the beginning of the recording of an audio segment, a header string is recorded including an identification code for the audio segment. When the audio recording is interrupted, a continuation header is written upon recommencement of the recording after the interruption giving the segment identification code and the number of breaks in the recorded audio segment up to this point. Upon completion of recording of the audio segment, a trailer sequence is written giving the audio segment identification code and an end-of-segment signal.

These and other features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
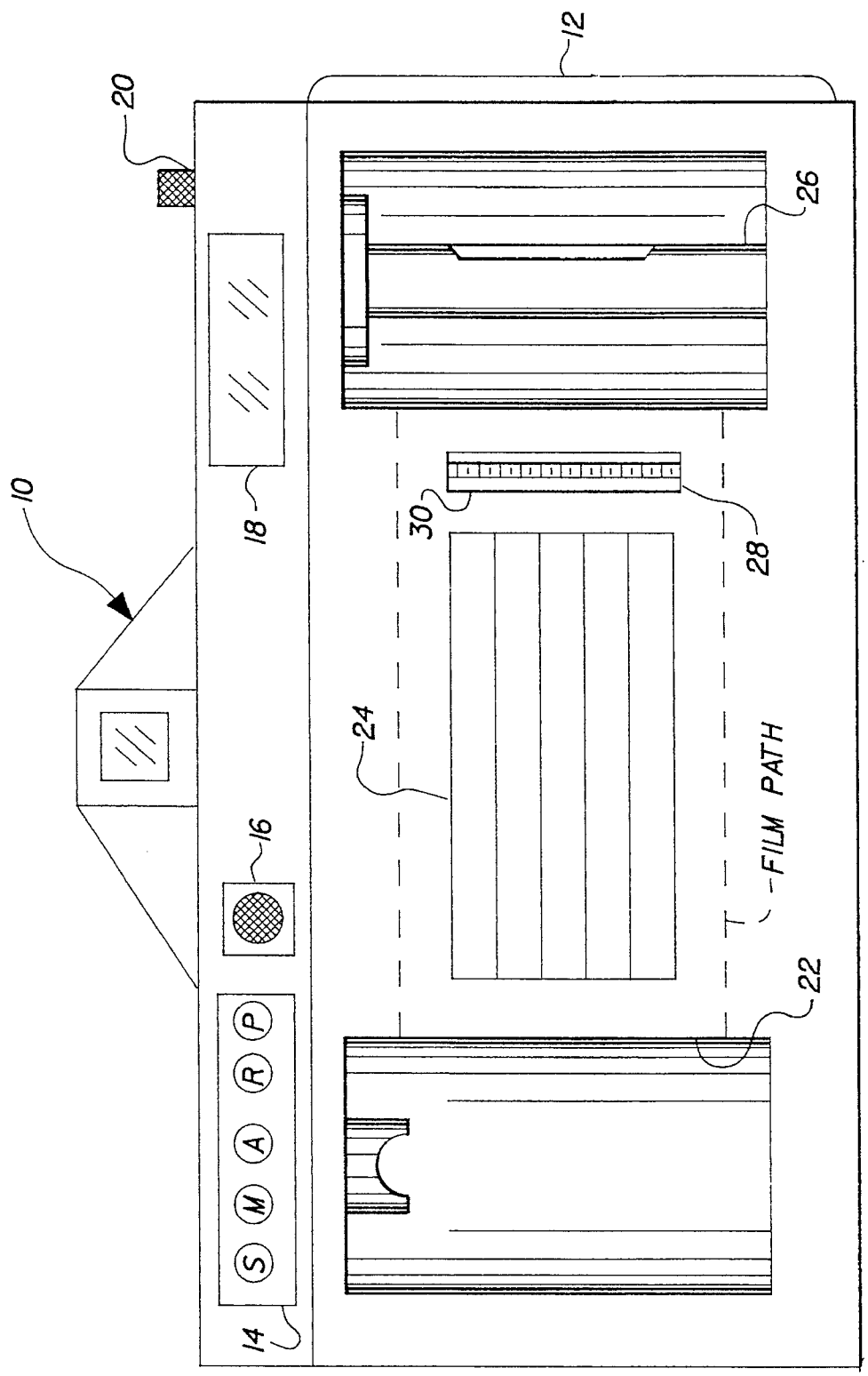
FIG. 1 is a rear elevation view of a photographic still camera embodying the invention.

A back view of a single lens reflex type camera incorporating the invention is illustrated in FIG. 1. The camera 10 is shown without its back cover plate which would normally cover a lower portion 12 thereof. The camera 10 includes a user interface 14 having a plurality of control buttons and/or switches to permit an operator to enter various commands into a camera control processor 34 (FIG. 2), a speaker 16 for replaying recorded audio information, a liquid crystal display (LCD) 18 for displaying various information concerning the operation of the camera, and a microphone 20 for recording audio information. The camera 10 further includes a conventional film cartridge receiving chamber 22, a shutter mechanism 24, and a film take-up spool 26 (motor driven) which is used to wind film from a film cartridge along the camera's film path after each exposure. In addition, a slot 28 is provided in the film path containing an optical write head 30 comprising a line of LED light sources for optically exposing data bits, representing audio information, on the emulsion of the film in camera 10.

Figure 2:
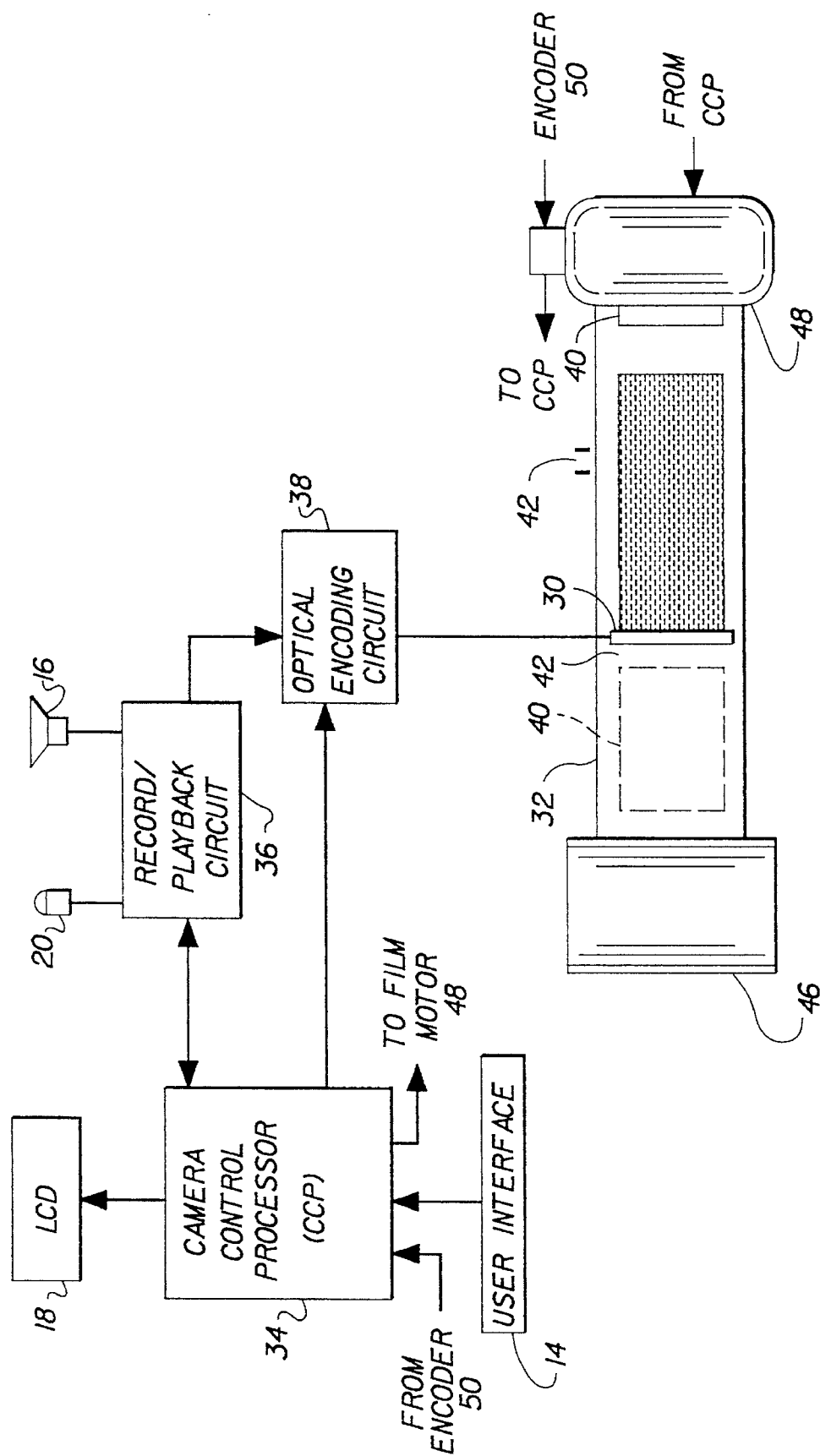
FIG. 2 is a schematic block diagram of an electronics system for the camera of FIG. 1.

An electrical schematic diagram of the camera 10 is illustrated in FIG. 2. As was mentioned above, the user interface 14 and LCD 18 are coupled to the camera control processor 34, which controls the overall operation of the camera 10 in accordance with internal program-based commands and with commands entered by the operator via the user interface 14. The microphone 20 and the speaker 16 are coupled to a record/playback circuit 36, which is controlled by the camera control processor 34 and which has an output coupled to an optical encoding circuit 38. The record/playback circuit 36 includes a preamplifier, automatic gain control, filters, power output amplifiers and a nonvolatile analog memory. The output of the optical encoding circuit 38 is coupled to the optical write head 30 to cause exposure of digitally encoded data on the film 32 corresponding to the originally recorded audio.

Figure 3:
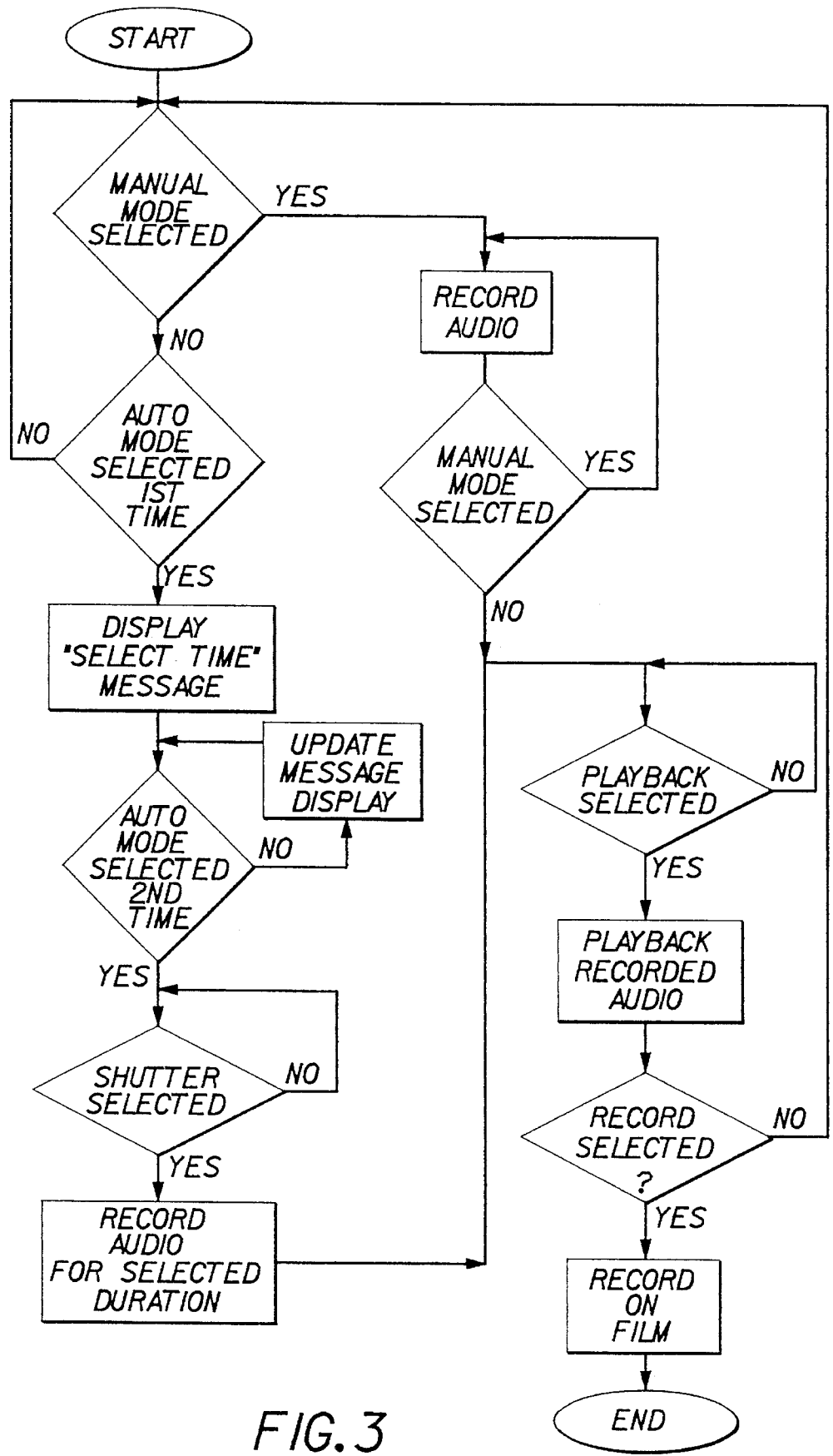
FIG. 3 is a program flow diagram for the camera control processor of FIG. 2 which illustrates variable segment length audio recording operation of the FIG. 1 camera.

The operation of camera 10 for variable segment length recording will now be described with joint reference to FIGS. 1–3. The camera 10 is loaded with film by placing a film cartridge 46 into the film cartridge receiving chamber 22 and threading the film take-up spool 26 in a conventional manner. In the illustrated embodiment, the film take-up spool 26 is preferably driven by transport mechanism utilizing a film motor 48 under control of the camera control processor 34, such that the film is automatically threaded and advanced to a first image frame position when the camera back is closed. Although not shown, the camera 10 preferably includes decoding circuitry to decode a DX code contained on the film cartridge, which is indicative of the film speed and number of exposures for the film contained in the cartridge. This information is supplied to the camera control processor 34.

The user enters a command via the user interface 14 to initiate an audio recording mode of operation for a given image frame. The camera control processor 34, in response to the command entered via the user interface, activates the record/playback circuit 36 to record and store an audio segment in the memory contained within the record/playback circuit 36. It should be noted that the actual recording of the audio segment by the record/playback circuit 36 can take place either before, after or during the exposure of each image frame, and the duration of each audio segment can vary based on commands entered by the operator. For example, in a manual mode of operation, the operator selects a manual mode button (M) on the user interface 14 that causes the camera control processor 34 to initiate recording for as long as the manual mode button is depressed up to a preset maximum (for example fifteen seconds) for a given picture film frame. The manual mode button can be used to record an audio segment prior to exposure of the corresponding picture film frame or after exposure of the corresponding picture film frame. To initiate an automatic mode of operation, the operator selects an automatic mode button (A) on the user interface 14 which causes the camera control processor 34 to display a message on the LCD 18 asking the operator to select the length of the recording segment. For example, the camera control processor 34 first displays the phrase "SELECT TIME" on the LCD 18 and subsequently displays the number of seconds to be selected in descending order ("15 SECS" . . . "14 SECS" . . . "13 SECS") until the operator activates the automatic mode button a second time to stop the countdown. The camera control processor 34 then activates the record/playback circuit 36 to record an audio segment of the selected duration when the shutter button (S) is activated to expose a picture film frame.

The operator also has the opportunity of reviewing the recorded audio segment by activating a playback button (P) on the user interface 14. Upon activation of the playback button, the camera control processor 34 controls the operation of the record/playback circuit 36 to playback the recorded audio segment from memory using the speaker 16. If the audio segment does not meet with the approval of the operator, the manual operation mode can be selected to record a new audio segment. The above operations are illustrated by the flow diagram shown in FIG. 3.

Figure 4:
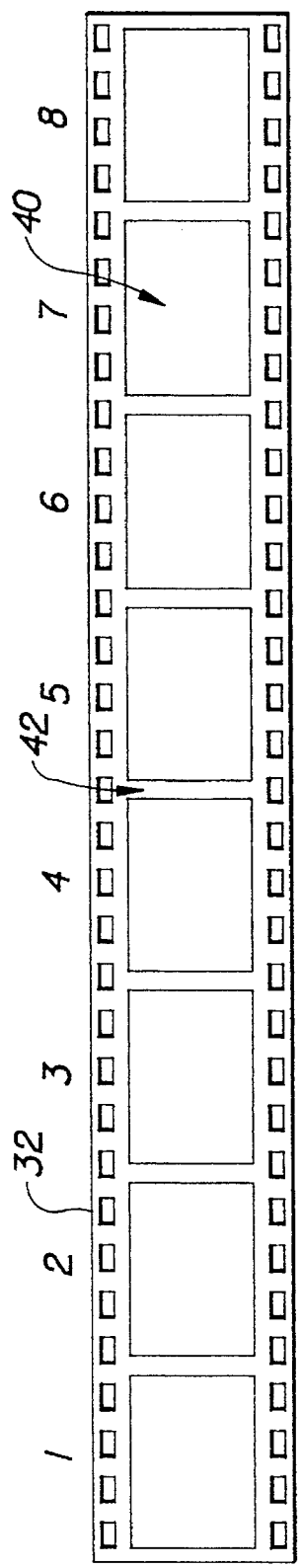
FIG. 4 is a diagram of a 35 mm film strip illustrating the layout of standard image frames on the strip.
Figure 5:
FIG. 5 is a diagram illustrating various standard interframe location cutting intervals used by photofinishing labs.
Figure 7:
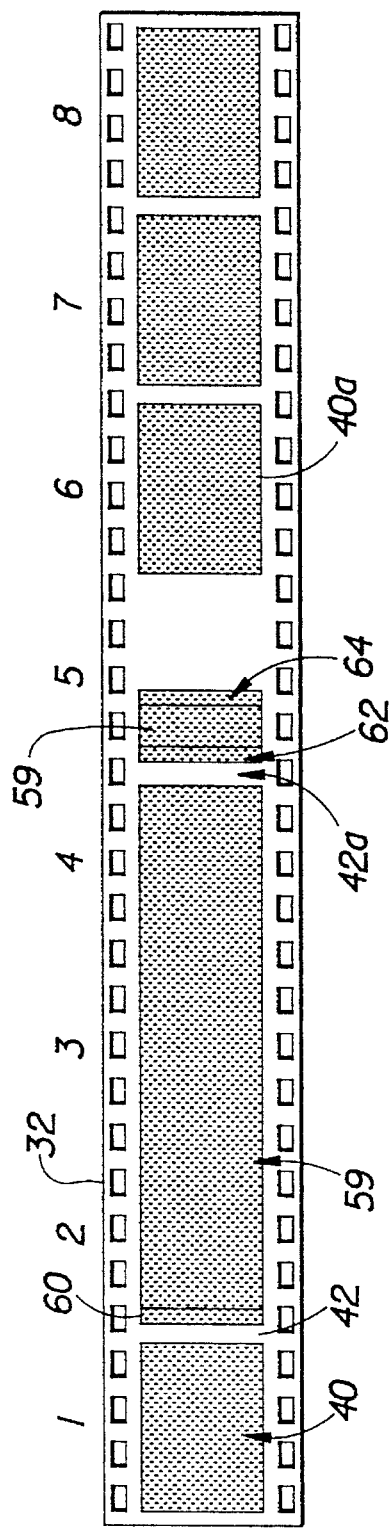
FIG. 7 is a diagram illustrating a 35 mm film strip utilizing optical recording of variable length audio segments in accordance with the invention.

Referring to FIG. 4, a conventional film is shown with image frames separated by interframe locations. As previously noted, a photofinishing lab typically cuts the elongated film in these interframe locations into short strips at intervals of 4, 5 or 6 images frames per strip. By advantageously allowing for the selection of variable audio recording times, the length of an encoded recording segment 50 can extend beyond the length of a standard image frame and thereby span the position of one or more interframe locations. If the film is cut at an interframe location spanned by the audio recording segment, the continuity of the audio recording is lost. In accordance with the invention, therefore, the recording on film is controlled so as to allow continuous audio recording only across interframe locations that are not divisible by a frame interval normally used by the photofinishing lab in cutting the film into strips. In other words, according to the invention, continuous recording is interrupted for intervals of interframe location intervals that are multiples of the number of image frames used for cut film strips, i.e. multiples of 4, 5, or 6 image frames. This is shown in the diagrams of FIG. 7, where the numbers across the top represent standard image frame locations and the dark lines in rows 52, 54 and 56 represent those interframe locations where recording would be interrupted for intervals of 4, 5 and 6 frames, respectively. Row 58 illustrates where the recording interruptions would occur on a film strip for all three cut strip possibilities.

Figure 6:
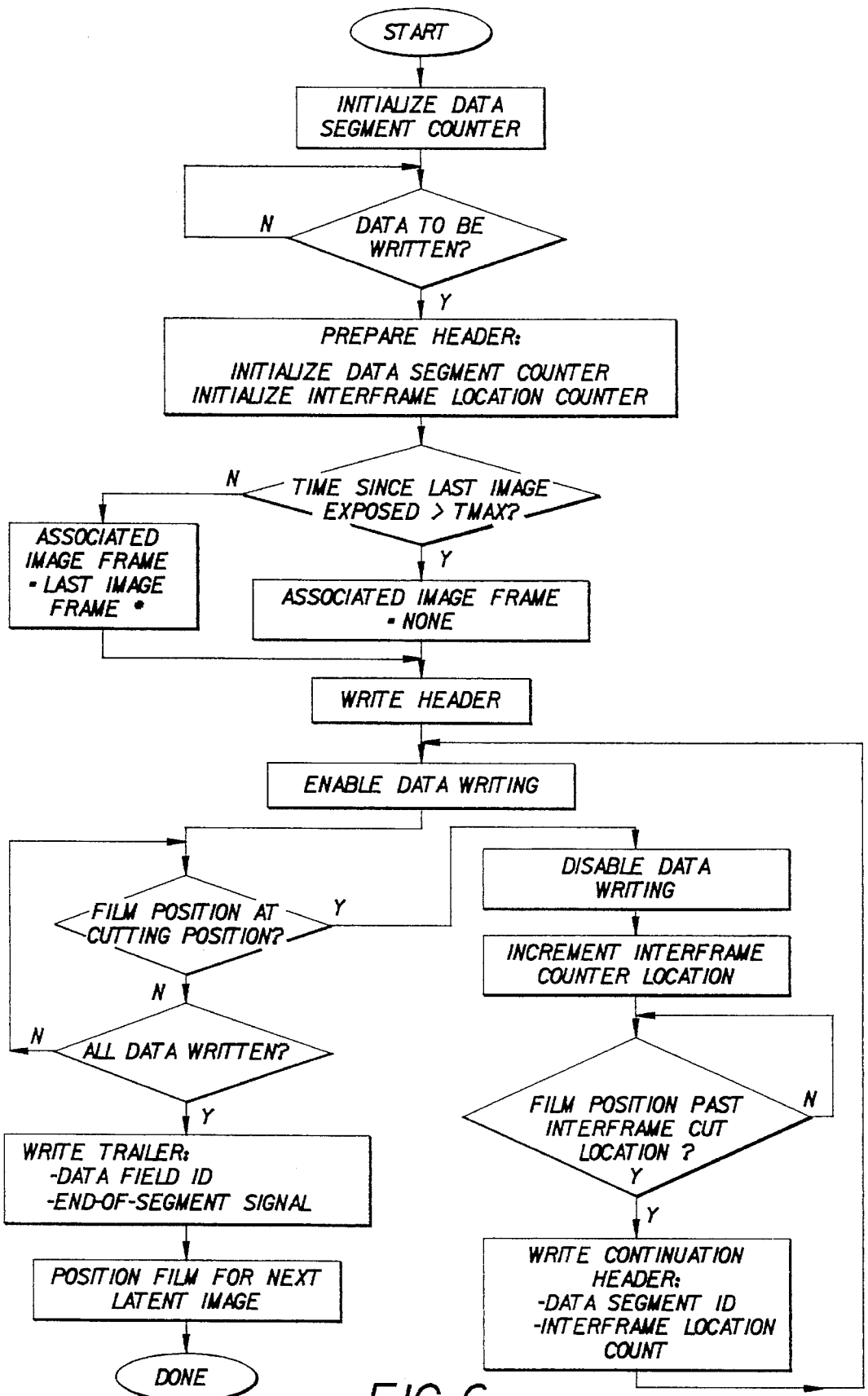
FIG. 6 is a program flow diagram for the camera control processor of FIG. 2 illustrating variable segment length audio recording operation of the FIG. 1 camera in accordance with the present invention.

The manner in which the control processor can be programmed to operate in accordance with the invention is shown in the program flow chart of FIG. 6. At the beginning of the audio recording initiated by the camera user, as described above in connection with FIG. 3, the control processor first assembles a simple header string including an identification code for the audio segment and the associated image frame, if any. Recording of the audio data then begins. If the recording reaches an interframe location that is determined to be a multiple of the film strip cutting interval, the control processor interrupts the recording and increments the interframe location counter. When the film is determined to have passed the interframe location, data recording is recommenced. At this time, a continuation header is recorded which includes the audio segment identification code and the interframe location count, the latter indicating the number of breaks in the audio segment that have occurred up to this point. The recording of audio data continues, with any necessary interruptions for encounters with restricted interframe locations as just described, until all data has been recorded. At this time, a trailer sequence is recorded which gives the audio segment identification code and an "end-of-segment" signal. The camera control processor then moves the film forward to the next synchronized image frame position for latent image exposure. This latter operation assures maintenance of the integrity between the detected standard interframe location positions and the standard frame interval cutting lengths at the photofinishing lab.

FIG. 7 shows the physical layout of an elongate length of film 32 before being cut into strips and on which an audio data segment is recorded optically as described above. It can be seen that the audio segment 59 starts after the interframe location 42 immediately following the first exposed image frame 40, beginning with a header 60 and extending across the interframe locations between image frame areas 2, 3 and 4. The recording is interrupted at interframe location 42a which is the first potential film strip cutting location. The recording recommences after the interframe location 42a and starting with continuation header 62 and ends with trailer 64. The next exposed image frame 40a, the second in the sequence, is then located at image frame location number six, thereby maintaining the positional integrity for purposes of cutting the film into strip of appropriate frame length.

Figure 8:
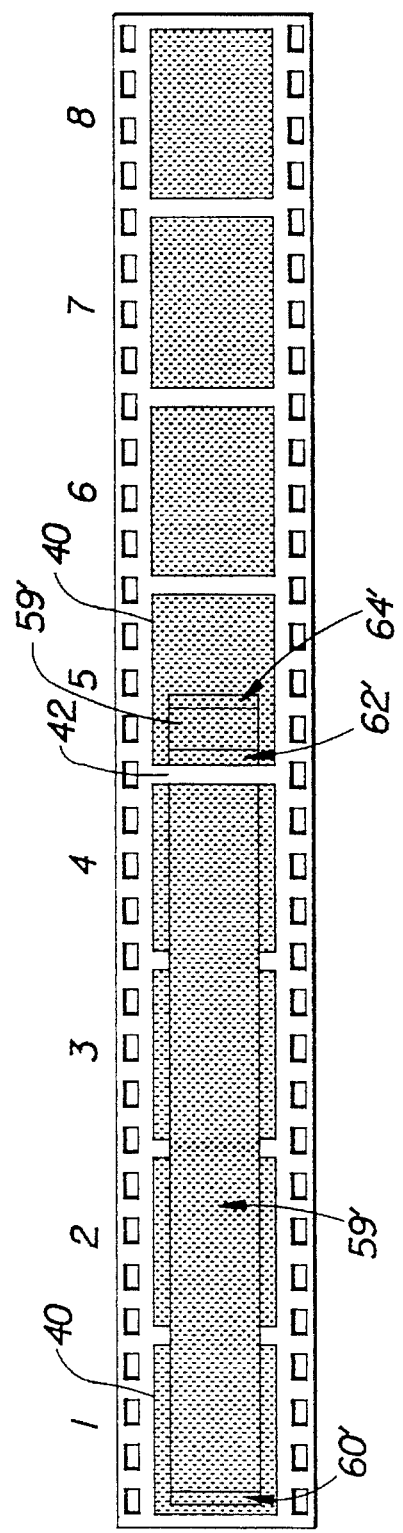
FIG. 8 is a diagram similar to that of FIG. 7 illustrating the invention applied to variable length audio segments magnetically recorded on film in accordance with the invention.

As an alternative to optical audio recording, the audio data can be recorded on film magnetically on a layer of virtually transparent magnetic material typically deposited on the opposite side of the film base from the emulsion. A suitable arrangement for magnetic recording in a camera on magnetically coated film material is described in the aforementioned U.S. Pat. No. 4,965,627, the disclosure of which is incorporated herein by reference. FIG. 8 shows an elongate film on which the audio data is recorded magnetically. When recording audio data magnetically, the camera may leave the photosensitive frame areas on the film unexposed in a manner similar to when optical audio recording is employed. However, if the camera has more sophisticated integral control over forward and backward film motion (i.e. in the unwind and rewind gearing between the start and end of the film) the camera control processor can alternatively be programmed to handle the magnetic and photosensitive surfaces as independent recording channels. In this mode of operation the camera control processor, in conjunction with film position encoder 50 (FIG. 2), keeps track of the film position where data recording was last finished and the film position where a latent image exposure was last exposed. After recording an extended audio data segment, the control processor rewinds and positions the film so that the next available unexposed latent image frame area is positioned in the exposure gate of the camera. Then, when another data block was prepared for writing, the control processor then repositions the film to the next unexposed frame area. As seen in FIG. 8, although the audio segment 59' extends into the area of frame number five, because the magnetic recording is on a virtually transparent magnetic layer the camera repositions frame number 2 in the camera exposure gate (shutter 24) for exposure of the next image frame.

It can be seen from the foregoing that by appropriately interrupting data recording at interframe locations that correspond to positions at which film strips are cut at a photofinishing lab, selection of extended, variable audio recording times can be allowed without loss of continuity in the recording segments. Moreover, by providing a user selectable frame interval length to specify a known cutting length via the interface 14 in the camera, an even more efficient use of the recording area on the film is achieved. This is an advantage when the user repeatedly has film processed at the same photofinisher and the cutting interval is therefore known in advance to the user.

The invention has been described in detail with particular reference to a presently preferred embodiment, but it will be understood that variations and modifications can be effected within the scope of the invention as set forth in the claims appended hereto. For example, while the invention has been described in the context of an embodiment in which audio information is recorded on film, it will be appreciated that other data, such as digitized image data and camera operating data might also be recorded across interframe locations that would correspond to film cut locations at the photofinishing lab and thus the invention is not limited to the type of information that might be so recorded.

PARTS LIST 10 camera
12 lower camera portion
14 user interface
16 speaker
18 liquid crystal display (LCD)
20 microphone
22 film cartridge receiving chamber
24 shutter mechanism
26 film take-up spool
28 slot
30 write head
32 film
34 camera control processor
36 record/playback circuit
38 optical encoding circuit
40 image frames
42 interframe locations
46 film cartridge
48 film motor
50 film position encoder
52 4-frame interframe location intervals
54 5-frame interframe location intervals
56 6-frame interframe location intervals
58 combined interframe location intervals
59 audio recording segment
60 audio segment header
62 audio segment continuation header
64 end of segment trailer code

What is claimed is:

1. A photographic camera with data recording on film comprising:
   data signal recording means for recording data in the camera in a data segment extending continuously along a stretch of photographic film spanning at least one interframe location between successive standard image frame areas on the film; and
   control means for interrupting said continuous recording during those interframe locations occurring at predetermined intervals of at least four successive image frame lengths corresponding to intervals at which said film is cut into strips at a photofinishing facility.

2. A photographic camera according to claim 1, wherein said recording is interrupted during interframe locations occurring at intervals of multiples of 4, 5, or 6 standard image frame lengths measured from a common starting point on the film.

3. A photographic camera according to claim 1, wherein said recording means includes a magnetic record head for recording said data on a magnetic layer formed on the film.

4. A photographic camera according to claim 3, wherein recording head is so positioned in the camera to record over optically exposed image frame areas on the film.

5. A photographic camera according to claim 1, wherein said recording means includes an optical record head for recording said data optically on the film.

6. A photographic camera according to claim 1, wherein said control means includes means for recording a header at the beginning of the segment including a data segment identification code and a trailer sequence at the end of the segment including an "end of segment" code.

7. A photographic camera according to claim 6 wherein said header includes a code identifying an associated exposed image frame.

8. A photographic camera according to claim 6 wherein said control means further includes means for recording a continuation header following an interruption in data segment recording at an interframe location, the continuation header including said data segment identification code and the number of previous interruptions in the recorded data segment.

9. The camera of claim 1 wherein said recorded data is audio information.

10. The camera of claim 1 wherein said recorded data is digitized image information.

11. A method of recording data on a photographic film strip along a length thereof spanning interframe locations between standard image frame regions on the film comprising:

recording a header string at the beginning of the recording of a data segment, the header string including an identification code for the data segment;

interrupting said recording periodically at those interframe locations corresponding to multiples of frame lengths at which the film strip is cut at a photofinishing facility;

upon recommencement of the recording after the interruption, recording a continuation header giving said data segment identification code and the number of interruptions in the recorded data segment up to this point of recommencement; and upon completion of recording of the data segment, recording a trailer sequence giving the data segment identification code and an end-of-segment code.

* * * * *